(12) United States Patent
Yasuda et al.

(10) Patent No.: US 8,494,352 B2
(45) Date of Patent: Jul. 23, 2013

(54) IMAGING DEVICE

(75) Inventors: Takuro Yasuda, Tokyo (JP); Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/344,925

(22) Filed: Jan. 6, 2012

(65) Prior Publication Data

US 2012/0177351 A1   Jul. 12, 2012

(30) Foreign Application Priority Data

Jan. 11, 2011  (JP) ................................. 2011-003254

(51) Int. Cl.
*G03B 17/00*    (2006.01)

(52) U.S. Cl.
USPC .............................................. 396/50; 396/53

(58) Field of Classification Search
USPC ................................................ 396/50, 52–54
See application file for complete search history.

(56) References Cited

U.S. PATENT DOCUMENTS

| | | | |
|---|---|---|---|
| 6,104,878 A * | 8/2000 | Toguchi et al. | 396/52 |
| 6,304,726 B1 * | 10/2001 | Watanabe | 396/53 |
| 7,116,362 B2 | 10/2006 | Kitajima et al. | |
| 7,180,543 B2 | 2/2007 | Ojima et al. | |
| 7,283,736 B2 | 10/2007 | Sugiura et al. | |
| 7,301,579 B2 | 11/2007 | Shinohara et al. | |
| 7,541,551 B2 * | 6/2009 | Wehrenberg | 200/61.45 R |
| 7,580,623 B2 | 8/2009 | Nuno et al. | |
| 7,609,957 B2 | 10/2009 | Sugiura | |
| 7,645,078 B2 | 1/2010 | Sugiura | |
| 7,656,457 B2 | 2/2010 | Ojima et al. | |
| 7,777,802 B2 | 8/2010 | Shinohara et al. | |
| 7,777,968 B2 | 8/2010 | Sugiura | |
| 8,000,042 B2 | 8/2011 | Nuno et al. | |
| 8,180,211 B2 * | 5/2012 | Gerhards | 396/87 |
| 2006/0056829 A1 * | 3/2006 | Hirota et al. | 396/54 |
| 2008/0008462 A1 * | 1/2008 | Klinghult | 396/53 |
| 2009/0096910 A1 | 4/2009 | Yasuda et al. | |
| 2009/0141135 A1 | 6/2009 | Suzuki et al. | |
| 2009/0284845 A1 | 11/2009 | Sugiura | |
| 2011/0007168 A1 | 1/2011 | Nagara et al. | |
| 2011/0075275 A1 | 3/2011 | Sugiura | |
| 2011/0200316 A1 | 8/2011 | Sugiura | |

FOREIGN PATENT DOCUMENTS

| | | | |
|---|---|---|---|
| GB | 2416036 A * | 1/2006 | |
| JP | 05181180 A * | 7/1993 | |
| JP | 2006-292690 | 10/2006 | |
| JP | 2009-94987 | 4/2009 | |
| JP | 2009-147863 | 7/2009 | |
| JP | 2009-225201 | 10/2009 | |

OTHER PUBLICATIONS

Machine translation of JP2006-292690 Oct. 2006.*

* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

An imaging device includes a three-axis acceleration detector, an inclination calculator to calculate an amount of inclination of the imaging device according to an output value of the acceleration detector, a determining element to determine whether or not the imaging device is dropping or receiving an impact according to the output value of the acceleration detector, a mode switching element to set the acceleration detector to be in either an electronic level mode or an impact detection mode by changing at least one of a measuring range and a sampling rate of the acceleration detector, and a storing element to store detected acceleration data in time series. When the determining element determines that the imaging device has dropped or received an impact in the impact detection mode, the storing element stores acceleration data detected at a time when the drop or impact has occurred.

11 Claims, 5 Drawing Sheets

IMAGING DEVICE

CROSS REFERENCE TO RELATED APPLICATION

The present application is based on and claims priority from Japanese Patent Application No. 2011-3254, filed on Jan. 11, 2011, the disclosure of which is hereby incorporated by reference in its entirety.

BACKGROUND OF THE INVENTION

1. Field of the Invention

The present invention relates to an imaging device having an electronic level function.

2. Description of the Prior Art

For example, Japanese Patent Application Publication No. 2009-94987 discloses an imaging device including an electronic level and an acceleration sensor to indicate the inclination of the device. In general the acceleration sensor is used to detect the aspect (length and breadth) of a captured image to display the captured image in the right aspect together with the electronic level. Further, Japanese Patent Application Publication No. 2009-225201 discloses an imaging device configured to detect an impact on the imaging device with an acceleration sensor and store a result of the detection as a log. Japanese Patent Application Publication No. 2006-292690 discloses an imaging device configured to detect an impact on the device by changing a measuring range and a sampling interval of an acceleration sensor after the occurrence of a free fall.

However, there is a problem in the imaging device in the JP2006-292690 document that it cannot deal with an impact on the device when it hits an object or a surface without a free fall. Another problem is that the acceleration sensor can be used for both the electronic level and the impact detection but required precision of the acceleration sensor is different in the electronic level and the impact detection. For the electronic level, the accelerator sensor is required to detect acceleration gravity so that sufficient measuring range thereof will be 1 G. For the impact detection, it is required to exert the measuring range of several G or more depending on a desired amount of impact to be detected. Also, a required sampling interval of the acceleration sensor is different in the electronic level and the impact detection. The sampling interval has to be set very short in the impact detection to be able to detect an instant impact. It is preferable to directly use the output values of the acceleration sensor.

For the purpose of improving the precision of the electronic level, a shorter sampling interval is preferable, however, it does not need to be as short as that in the impact detection. Further, the output values of the acceleration sensor need to be averaged to reduce a variation in the values.

SUMMARY OF THE INVENTION

An object of the present invention is to provide an imaging device which can switch the electronic level mode and impact detection mode of an acceleration sensor on the basis of a usage condition to satisfy required precision of the acceleration sensor in both modes without a complicated control system, and can easily and accurately find the cause of an impact or damage of the device when it occurs.

According to one aspect of the present invention, an imaging device includes an acceleration detector configured to detect acceleration of the imaging device on three axes, an inclination calculator configured to calculate an amount of inclination of the imaging device on the basis of an output value of the acceleration detector, a determining element configured to determine whether or not the imaging device is dropping or receiving an impact on the basis of the output value of the acceleration detector, a mode switching element configured to set the acceleration sensor to be in either an electronic level mode or an impact detection mode by changing at least one of a measuring range and a sampling rate of the acceleration detector, the electronic level mode in which an operator is notified of an inclination level of the imaging device, and the impact detection mode in which the determining element makes the determination, and a storing element configured to store detected acceleration data in time series, wherein when the determining element determines that the imaging device has dropped or received an impact in the impact detection mode, the storing element stores acceleration data detected at a time when the drop or impact has occurred.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Hereinafter, one embodiment of the present invention will be described in detail with reference to the accompanying drawings. Wherever possible, the same reference numbers will be used throughout the drawings to refer to the same or like parts.

Figure 1:
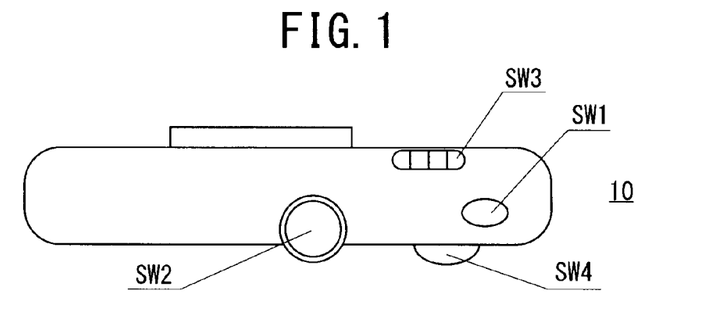
FIG. 1 is a top view of a digital camera as an imaging device according to one embodiment of the present invention.
Figure 2:
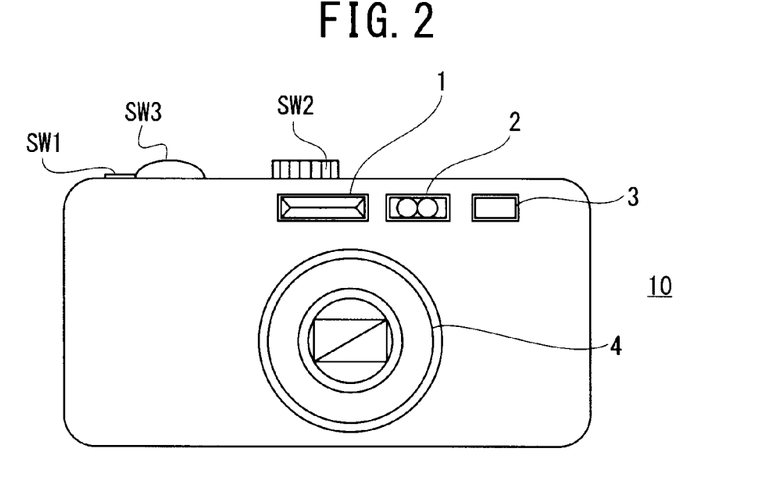
FIG. 2 is a front view of the digital camera in FIG. 1.
Figure 3:
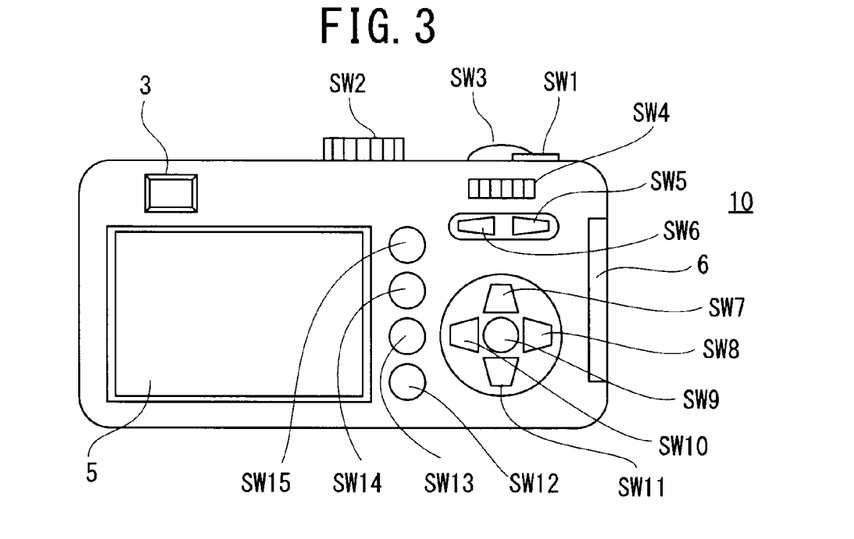
FIG. 3 is a back view of the digital camera in FIG. 1.
Figure 4:
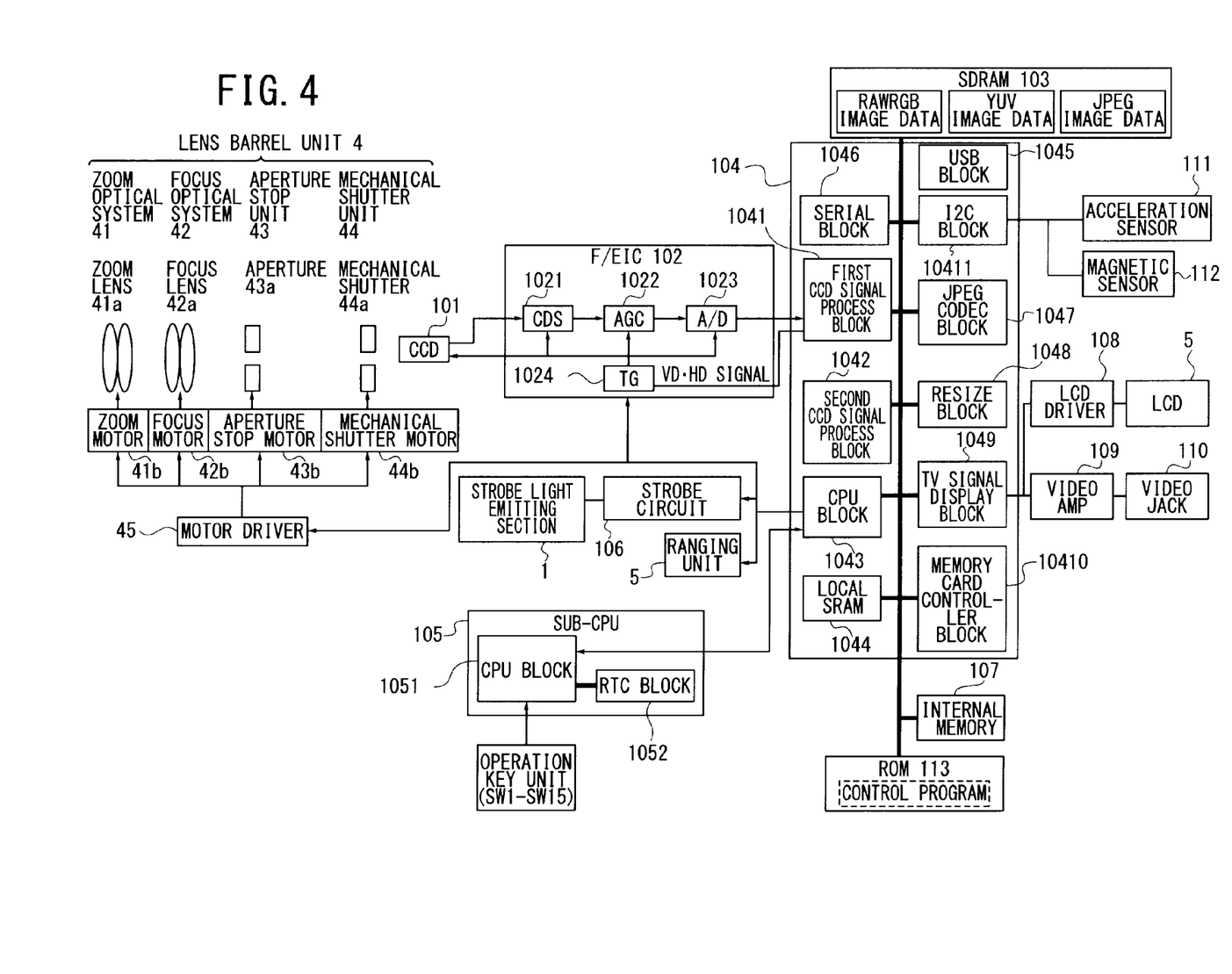
FIG. 4 is a block diagram of the structure of the digital camera.

FIGS. 1 to 3 are top, front, back views of a digital camera as an example of an imaging device according to one embodiment of the present invention, respectively. FIG. 4 is a block diagram of the structure thereof.

As shown in FIG. 1, a digital camera (hereinafter, camera) 10 includes on the top face a shutter button SW1, a mode dial SW2, and a first job dial SW3, SW4. It includes on the front face a strobe light emitting section 1, a ranging unit 2, an optical finder 3 and a lens barrel unit 4 in FIG. 2. On the back face, it includes an LCD 5, a battery cover 6, a second job dial SW4, a telephoto zoom switch SW5, a wide-angle zoom switch SW6, an upward switch SW7, a rightward switch SW8, an OK switch SW9, a leftward witch SW10, a downward/macro switch SW11, a display switch SW12, a delete switch SW13, a menu switch SW14, and a power switch SW15 in FIG. 3.

Referring to FIG. 4, the structure of the digital camera 10 is described. A CCD 101 is an image sensor to convert a subject image into an electric image signal and controlled by a CPU block and output the image signal to an F/E (front end)-IC 102 for noise removal. The F/E-IC 102 includes a correlated double sampling (CDS) 1021, an automatic gain controller (AGC) 1022 and an analog-digital (A/D) converter 1023 to convert the electric image signal from the CCD 101 into a digital signal and output it to a first CCD signal processing block 1041 of a processor 104. It also includes a timing generator (TG) 1024 supplied with a vertical drive (VD) signal and a horizontal drive (HD) signal from the first CCD signal processing block 1041 to generate drive timing signals to the CCD 101 and the F/F-IC 102.

The lens barrel unit 4 includes a zoom optical system 41 having a zoom lens 41a, a focus optical system 42 having a focus lens 42a, an aperture stop unit 43 having an aperture stop 43a and a mechanical shutter unit 44 having a mechanical shutter 44a. The optical zoom system 41, optical focus system 42, aperture stop unit 43 and mechanical shutter unit 44 are driven by a zoom motor 41b, a focus motor 42b, an aperture stop motor 43b and a mechanical shutter motor 44b, respectively. These motors are driven by a motor driver 45 which is controlled by a CPU block 1043 of the processor 104.

An ROM 113 stores a control program and parameters decodable by a CPU block 1043. Upon the turning-on of the camera 10, the control program is loaded onto a not-shown main memory, and the CPU block 1043 controls the operations of elements of the camera by the program, and temporarily stores necessary data on an SDRAM 103 and a local SRAM 1044 of the processor 104. The ROM 113 is a rewritable flash ROM so that the control program and parameters are changeable to easily update the camera functions.

The processor 104 includes the first charge coupled device (CCD1) signal processing block 1041 to perform signal processing such as white balance adjustment, γ adjustment to the digital signal from the F/E IC 102 and output the VD/HD signals, a second CCD (CCD2) signal processing block 1042 to convert image data to brightness data and color difference data by filtering, the CPU block 1043, the local SRAM 1044, a USB block 1045 for communication with an external device as a personal computer, a serial block 1046 for serial communication with an external device as a personal computer, a JPEG CODEC block 1047 for JPEG compression and decompression, a resize block 1048 for expansion/reduction of the size of image data by interpolation, a TV signal display block 1049 to convert the image data into a video signal for display on a display device as an LCD or TV, and a memory card controller block 10410 to control a memory card in which captured image data are recorded. These blocks are connected with each other by bus lines.

The SDRAM 103 temporarily stores RAW-RGB image data, YUV image data and JPEG image data for various processing to the image data by the processor 104. An internal memory 107 is a memory in which captured image data are stored. An LCD driver 108 drives an LCD 5 and also converts the video signal from the TV signal display block 1049 to a signal for display on the LCD 5. The LCD 5 displays images to allow a user to monitor a subject before shooting, check a captured image, or reproduce image data from the internal memory 107 or memory card.

A video amplifier 118 is configured to convert the video signal from the TV signal display block 1049 into one with 75Ω impedance, and a video jack 119 is a connector for an external display device as TV.

An operation key unit includes the switches SW1 to SW15 and is manipulated by a user. A sub-CPU 105 outputs signals from the operation key unit to the CPU block 1043 in accordance with a user's manipulation. It also communicates with an RTC block 152 as a timer to adjust time.

The camera 10 also includes an acceleration sensor 111 as an acceleration detector to detect acceleration on three axes and a magnetic sensor 112 in communication with an I2C block 10411. The CPU block 1043 receives data from the sensors 111, 112 to calculate the inclination or direction of the camera 10 and display it on the LCD 5 or else.

The CPU block 1043 functions as an inclination calculator to calculate the inclination of the camera 10 according to output values of the three-axis acceleration sensor 111, a determining element to determine whether or not the digital camera 10 is dropping or receiving an impact on the basis of output values of the acceleration sensor, a mode switching element to set the acceleration sensor to be in either an electronic level mode or an impact detection mode, and a storing element to store detected acceleration data in time series. The mode dial switch SW2 in FIGS. 2-3 is a shooting mode switch element.

First Embodiment

The camera 10 includes an electronic level mode and an impact detection mode for the three-axis acceleration sensor 111. The electronic level indicates an inclination or a horizontal state of the camera 10 by calculating the angle of the camera from acceleration gravity detected with the acceleration sensor 111. The impact detection is used to detect an impact on the camera when it drops or strikes an object or a surface and store a result of the detection for the purpose of finding the cause of damage of the camera. The measuring range and sampling frequency of the three-axis acceleration sensor 111 are made changeable. In the electronic level mode the measuring range is narrowed to increase resolution and the sampling frequency is set low to reduce power consumption. In addition, the output values of the acceleration sensor are averaged to reduce variation. Meanwhile, in the impact detection mode the measuring range is widened to measure the magnitude of an impact and the sampling frequency is set high not to fail to detect an instantaneous impact. The output values thereof are not averaged.

Figure 5:
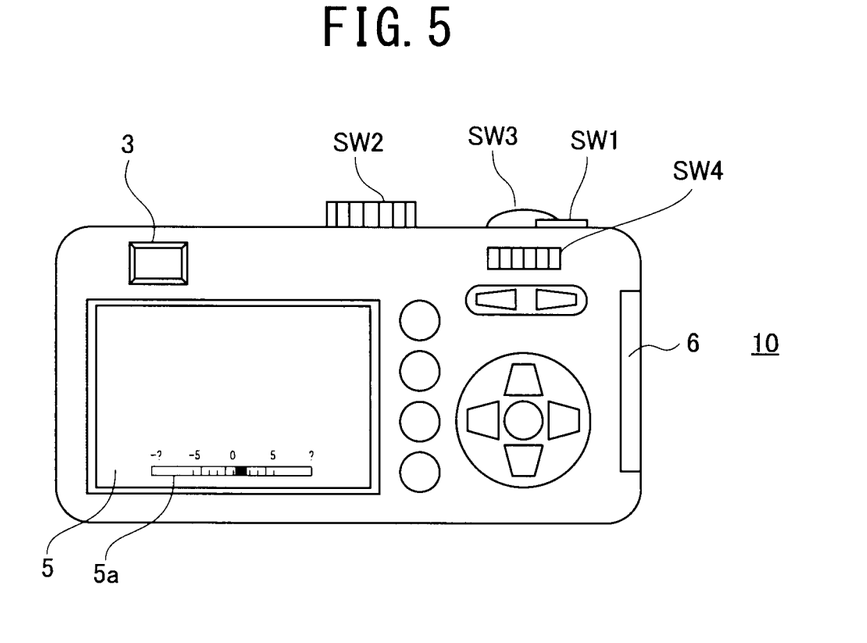
FIG. 5 shows an electronic level displayed on an LCD.

The electronic level mode is set or cancelled via the menu switch 14. With the electronic level mode set, an electronic level 5a is displayed on the LCD 5 for a user. Sound can be issued with the display. With the electronic level mode off, the acceleration sensor 111 is set in the impact detection mode. The measuring range of the acceleration sensor 111 on each axis is set to 6 G and the sampling frequency thereof is at 100 Hz.

In the impact detection mode the measuring range is set to 16 G and the sampling frequency is at 1,000 Hz. Detecting an acceleration value of 10 G or more on any axis is defined as impact detection. Upon detection of an impact, acceleration data are acquired at and after the detection and stored as a log together with acceleration values on the three axes as a maximal synthetic acceleration. Upon no detection of an impact, the angle of the camera is calculated from acceleration data on each axis as in the electronic level mode.

Second Embodiment

A difference in the second embodiment from the first embodiment is in that the acceleration sensor 111 can be switched from the electronic level mode to the impact detection mode depending on a mode of the digital camera 10. The settings and operation of the impact detection mode are the same as those in the first embodiment. First, the mode of the digital camera 10 is checked. In a shooting mode the acceleration sensor is set in the electronic level mode with the electronic level set via the menu switch, as in the first embodiment. In a reproduction mode it is set in the impact detection mode. In the reproduction mode the acceleration sensor is used to detect the aspect (length and breadth) of a captured image and of the LCD 5 the user is viewing to display the capered image in the right aspect. The aspect detection does not require a high precision of the electronic level and detection of vertical and horizontal angles (±90 degrees and zero degree) is sufficient. Therefore, in the reproducing mode the digital camera 10 can be set in the impact detection mode.

Third Embodiment

The present embodiment describes three examples where the acceleration sensor 111 is switched from the electronic level mode to the impact detection mode during the shooting mode. The settings and operation of the impact detection mode are the same as those in the first embodiment. In the first example, the mode switching is conducted on the basis of a detected angle. The electronic level is to indicate a horizon so that it needs to accurately indicate 0, 90, and 270 degrees only. Therefore, when the detected angle is for example 0±5 degrees, 90±5 degrees, and 270±5 degrees, the acceleration sensor 111 is set in the electronic level mode, and when it is other than these degrees, it is set in the impact detection mode.

In the second example, the mode switching is conducted on the basis of a variation in the output values of the acceleration sensor 111. With a variation in the output values of the acceleration sensor 111, it is switched to the impact detection mode. This is because a variation in the output values often occurs when the user is moving the camera so that a high precision of the acceleration sensor is not required. When the output values become stable, it is returned to the electronic level mode. Stable output values indicate that the user intends to use the level to determine the angle or mount the camera on a tripod.

In the third example, the mode switching is conducted on the basis of the level of acceleration. When the acceleration values calculated from the output values on the three axes fall outside a predetermined range of 1 G±0.3 G which corresponds to acceleration gravity, the acceleration sensor 111 is switched to the impact detection mode since it is assumed that the user intends to use the level, with the camera in a stable position.

Fourth Embodiment

Figure 6:
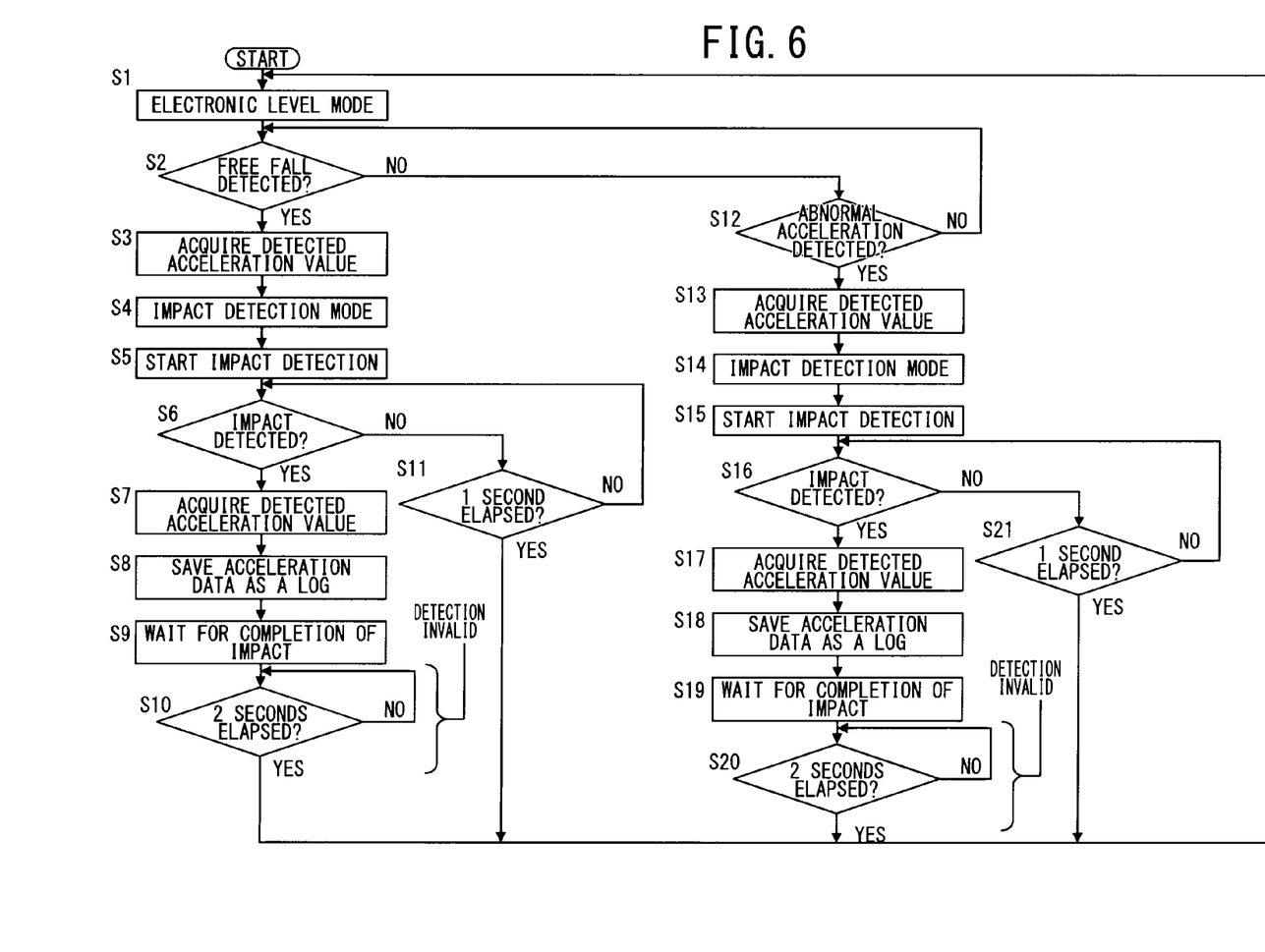
FIG. 6 is a flowchart for mode setting according to a fourth embodiment.

The fourth embodiment is described with reference to the flowchart in FIG. 6. In order to prevent too frequent mode switching, the present embodiment is configured that the camera 10 detects an abnormal state from the output values of the acceleration sensor 111 in the electronic level mode, shifts the sensor 111 into the impact detection mode, and stores a result of the detection by an impact as a log. The abnormal state refers to a free fall and an abnormal acceleration level of which the camera is falling or falling in rotation.

In step S1 the acceleration sensor 111 is in the electronic level mode by default. The measuring range of the acceleration sensor 111 is set to 2 G and the sampling frequency is set to 100 Hz. In step S2 a determination is made from the acceleration on whether or not a free fall or an abnormal level of acceleration has been detected. Occurrence of a free fall is determined when the acceleration value of 0.3 G or less on each axis is continuously detected for 200 ms or more. Upon determining that a free fall has occurred, detected acceleration data is acquired in step S3. In step S4 the acceleration sensor 111 is switched to the impact detection mode. The measuring range of the acceleration sensor 111 is set to 16 G and the sampling frequency is set to 1,000 HZ.

In step S5 impact detection starts. Occurrence of an impact is determined when any of the acceleration values on the three axes reaches 10 G or more even in an instant. Upon determining that an impact has occurred in step S6, detected acceleration data is acquired in step S7. In step S8 detected acceleration values on the three axes at the occurrence of the free fall and impact are saved as a log. In steps S9-S10 completion of the impact is waited for two seconds in which the impact detection becomes invalid for the purpose of preventing erroneous detection of a secondary impact of a bouncing camera. After elapse of 2 seconds, the acceleration sensor 111 is returned to the initial electronic level mode. When no impact is detected in step S6, the impact detection continues for one second in step S11. Then, with no detection, it is determined that no impact has occurred so that the acceleration sensor is returned to the initial electronic level mode with no acceleration data saved.

Next, abnormal acceleration detection is described. Abnormal acceleration is determined when the acceleration value of 1.0 G or more on each axis is continuously detected for 30 ms or more. Upon detection of the abnormal acceleration in step S12, detected acceleration data is acquired in step S13. In step S14 the acceleration sensor 111 is switched to the impact detection mode. The measuring range of the acceleration sensor 111 is set to 16 G and the sampling frequency is set to 1,000 Hz. In step S15 the impact detection starts. Occurrence of an impact is determined when any of the acceleration values on the three axes reaches 10 G or more even in an instant. Upon determining that an impact has occurred in step S16, detected acceleration data is acquired in step S17.

In step S18 detected acceleration values on the three axes at the occurrence of the abnormal acceleration and impact are saved as a log. In steps S19-S20 completion of the impact is waited for two seconds in which the impact detection becomes invalid for the purpose of preventing erroneous detection of a secondary impact of a bouncing camera. After elapse of 2 seconds, the acceleration sensor 111 is returned to the initial electronic level mode. When no impact is detected in step S16, the impact detection continues for one second in step S11. Then, with no detection, it is determined that no impact has occurred so that the acceleration sensor 111 is returned to the initial electronic level mode with no acceleration values saved.

Fifth Embodiment

Figure 7:
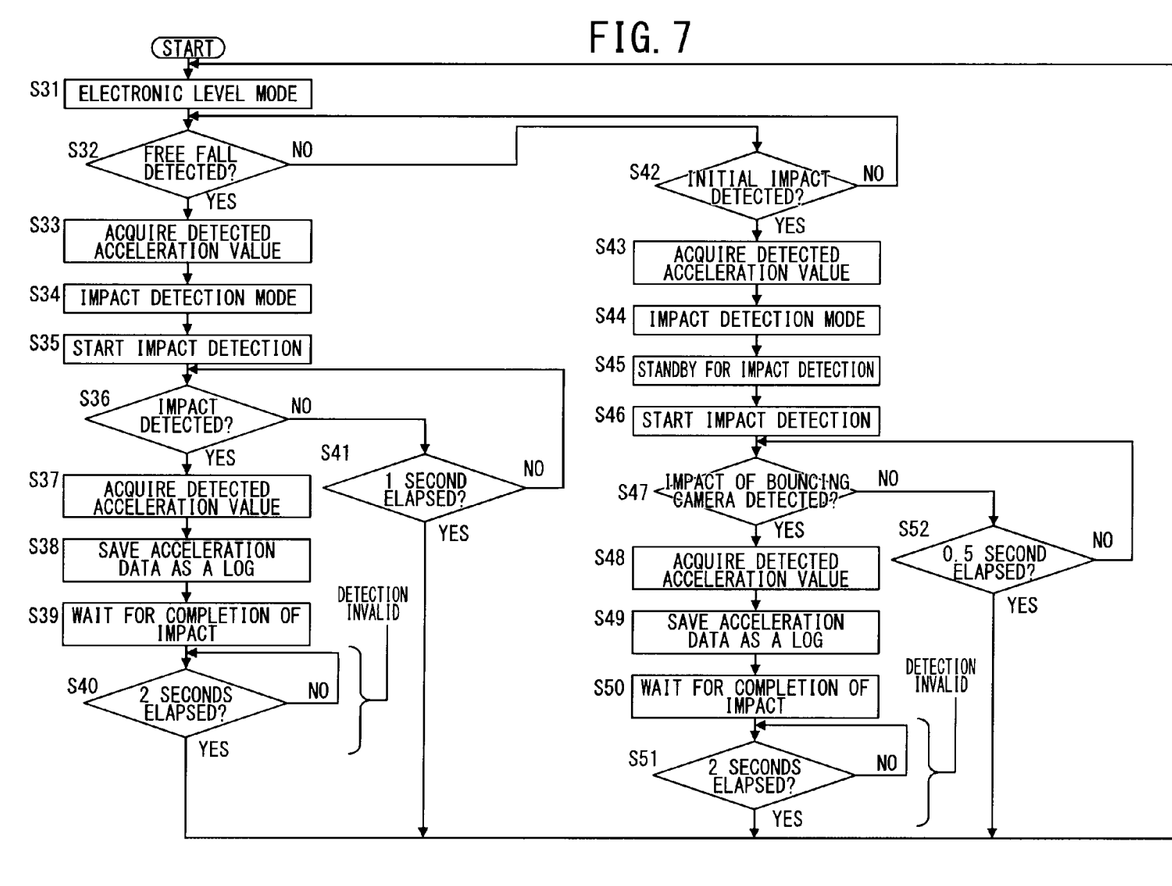
FIG. 7 is a flowchart for mode setting according to a fifth embodiment.

Detection of a secondary impact of a bouncing camera after having struck an object or a surface is described with reference to the flowchart in FIG. 7. The present embodiment is configured that the camera 10 detects anomaly from the output value of the acceleration sensor 111 in the electronic level mode, and shifts the acceleration sensor into the impact detection mode. The anomaly refers to a free fall and an initial impact. An impact detected in the impact detection mode is defined to be a secondary impact of a bouncing camera and the occurrence of the impact is saved as a log. The free fall detection in steps S31-S41 correspond to that in S1-S11 in FIG. 6 so that a description thereof is omitted.

The initial impact is determined when the acceleration value on each axis reaches 1.5 G or more even in an instant in step S42. Upon detection of the initial impact, detected acceleration data is acquired in step S43. Then, the acceleration sensor 111 is switched to the impact detection mode in step S44 where the measuring range of the acceleration sensor 111 is set to 16 G and the sampling frequency is set to 1,000 Hz. Assuming the occurrence of a bouncing camera, the impact detection is made invalid for 30 ms in step S45, and then starts in step S46. The impact of a bouncing camera is determined when the acceleration value on any of the axes reaches 10 G or more even in an instant in step S47. Upon detection of the impact of a bouncing camera, detected acceleration data is acquired in step S48. The detected acceleration values on the three axes at the occurrence of the initial and secondary impacts are saved as a log in step S49. Completion of the impact is waited in step S50.

The impact detection is made invalid for 2 seconds after the detection of the secondary impact in step S51. This makes it possible to prevent erroneous detection of secondary and subsequent impacts of a bouncing camera. After the elapse of 2 seconds, the acceleration sensor is returned to the initial electronic level mode. Upon no detection of a bouncing impact in step S47, the impact detection continues for 0.5 second in step S52. When no impact is detected, no acceleration data is saved, and the acceleration sensor 111 is returned to the initial electronic level mode.

According to the above embodiments the impact detection is determined by the acceleration on the three axes. However, it can be determined by synthetic acceleration.

According to the above embodiments, it is possible to realize the imaging device with a high precision acceleration sensor by switching the acceleration sensor between the electronic level mode and the impact detection mode on the basis of a usage condition. In addition, it is possible to easily and accurately find the cause of an impact or damage of the device when it occurs without a complicated control system.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An imaging device, comprising:
   an acceleration detector configured to detect acceleration of the imaging device on three axes;
   an inclination calculator configured to calculate an amount of inclination of the imaging device on the basis of an output value of the acceleration detector;
   a determining element configured to determine whether or not the imaging device is dropping or receiving an impact on the basis of the output value of the acceleration detector;
   a mode switching element configured to set the acceleration detector to be in either an electronic level mode or an impact detection mode by changing at least one of a measuring range and a sampling rate of the acceleration detector, the electronic level mode in which an operator is notified of an inclination level of the imaging device, and the impact detection mode in which the determining element makes the determination; and
   a storing element configured to store detected acceleration data in time series, wherein
   when the determining element determines that the imaging device has dropped or received an impact in the impact detection mode, the storing element stores acceleration data detected at a time when the drop or impact has occurred;
   the mode switching element is configured to set the measuring range to be larger and the sampling rate to be faster in the impact detection mode than in the electronic level mode; and
   the output value of the acceleration detector is averaged in the electronic level mode and not averaged in the impact detection mode.

2. An imaging device according to claim 1,
   the mode switching element is configured to set the acceleration detector to be in the electronic level mode when the acceleration falls within a predetermined range around gravity acceleration of the imaging device in a stationary state and to be in the impact detection mode when the acceleration falls outside the predetermined range.

3. An imaging device according to claim 1, wherein
   the mode switching element is configured to switch the electronic level mode to the impact detection mode when the acceleration exceeds a first predetermined value in the electronic level mode.

4. An imaging device according to claim 3, wherein:
   the mode switching element is configured to switch the electronic level mode to the impact detection mode when the acceleration exceeds a second predetermined value larger than the first predetermined value in the electronic level mode; and
   when the determining element determines that the imaging device has dropped or received an impact after the mode switching, the storing element stores, as a secondary impact, acceleration data detected at a time when the drop or impact has occurred.

5. An imaging device according to claim 1, wherein
   the mode switching element is configured to set the acceleration detector to be in either electronic level mode or the impact detection mode according to the amount of inclination calculated by the inclination calculator.

6. An imaging device according to claim 5, wherein
   the mode switching element is configured to set the acceleration detector to be in the electronic level mode when the amount of inclination calculated by the inclination calculator falls within a predetermined angular range around 0 degree, 90 degrees and 270 degrees of a rotation of the imaging device on an optical axis, defined that a posture of the imaging device at shooting is at 0 degree, and to be in the impact detection mode when the amount of inclination falls outside the predetermined angular range.

7. An imaging device according to claim 1, wherein
   the mode switching element is configured to switch the impact detection mode to the electronic level mode when a variation in the amount of inclination is continuously small for a predetermined period in the impact detection mode.

8. An imaging device according to claim 1, further comprising
   a display element on which the amount of inclination calculated by the inclination calculator is displayed, wherein
   the mode switching element is configured to set the acceleration detector to be in the impact detection mode while the amount of inclination is not displayed on the display element.

9. An imaging device according to claim 1, further comprising
   a shooting mode switch element, wherein
   the mode switching element is configured to set the acceleration detector to be in the impact detection mode while the imaging device is not in a shooting mode.

10. An imaging device, comprising:
    an acceleration detector configured to detect acceleration of the imaging device on three axes;
    an inclination calculator configured to calculate an amount of inclination of the imaging device on the basis of an output value of the acceleration detector;

a determining element configured to determine whether or not the imaging device is dropping or receiving an impact on the basis of the output value of the acceleration detector;

a mode switching element configured to set the acceleration detector to be in either an electronic level mode or an impact detection mode by changing at least one of a measuring range and a sampling rate of the acceleration detector, the electronic level mode in which an operator is notified of an inclination level of the imaging device, and the impact detection mode in which the determining element makes the determination; and a storing element configured to store detected acceleration data in time series, wherein when the determining element determines that the imaging device has dropped or received an impact in the impact detection mode, the storing element stores acceleration data detected at a time when the drop or impact has occurred; and the mode switching element is configured to set the acceleration detector to be in the impact detection mode when a variation in the amount of inclination calculated by the inclination calculator is larger than a predetermined variation amount.

11. An imaging device, comprising:

an acceleration detector configured to detect acceleration of the imaging device on three axes;

an inclination calculator configured to calculate an amount of inclination of the imaging device on the basis of an output value of the acceleration detector;

a determining element configured to determine whether or not the imaging device is dropping or receiving an impact on the basis of the output value of the acceleration detector;

a mode switching element configured to set the acceleration detector to be in either an electronic level mode or an impact detection mode by changing at least one of a measuring range and a sampling rate of the acceleration detector, the electronic level mode in which an operator is notified of an inclination level of the imaging device, and the impact detection mode in which the determining element makes the determination; and a storing element configured to store detected acceleration data in time series, wherein when the determining element determines that the imaging device has dropped or received an impact in the impact detection mode, the storing element stores acceleration data detected at a time when the drop or impact has occurred; and the determination on the drop or impact by the determining element becomes invalid during a standby period set after the detected acceleration data is acquired.

* * * * *